H. C. WIEDEMAN.
TANK CONSTRUCTION.
APPLICATION FILED JAN. 25, 1915.

1,191,547.

Patented July 18, 1916.
2 SHEETS—SHEET 1.

WITNESSES

INVENTOR
Henry C. Wiedeman
BY
Raymond A. Parker
ATTORNEY

H. C. WIEDEMAN.
TANK CONSTRUCTION.
APPLICATION FILED JAN. 25, 1915.

1,191,547.

Patented July 18, 1916.
2 SHEETS—SHEET 2.

WITNESSES
Robert N. Van B Davids
Virginia C. Spratt

INVENTOR
Henry C. Wiedeman
BY
Ralzemond A. Parker
ATTORNEY

UNITED STATES PATENT OFFICE.

HENRY C. WIEDEMAN, OF DETROIT, MICHIGAN.

TANK CONSTRUCTION.

1,191,547.   Specification of Letters Patent.   Patented July 18, 1916.

Application filed January 25, 1915. Serial No. 4,084.

*To all whom it may concern:*

Be it known that I, HENRY C. WIEDEMAN, a citizen of the United States, residing at Detroit, county of Wayne, State of Michigan, have invented a certain new and useful Improvement in Tank Construction, and declare the following to be a full, clear, and exact description of the same, such as will enable others skilled in the art to which it pertains to make and use the same, reference being had to the accompanying drawings, which form a part of this specification.

This invention relates to a method for building steel tanks and also the tank itself.
It has a special reference to enameled steel tanks which are rectangular.

The gist of the invention resides in the method of making a tank joint and in the joint itself, as will more fully appear hereinafter.

Figure 2:
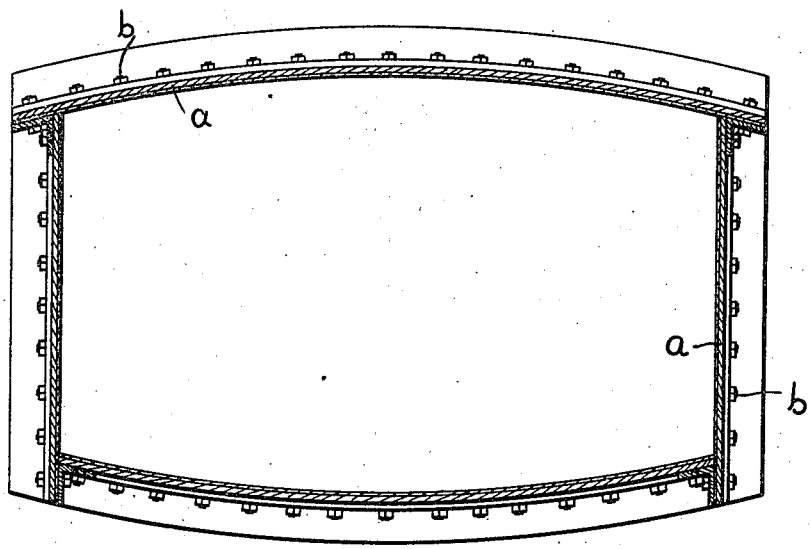
Figure 1:
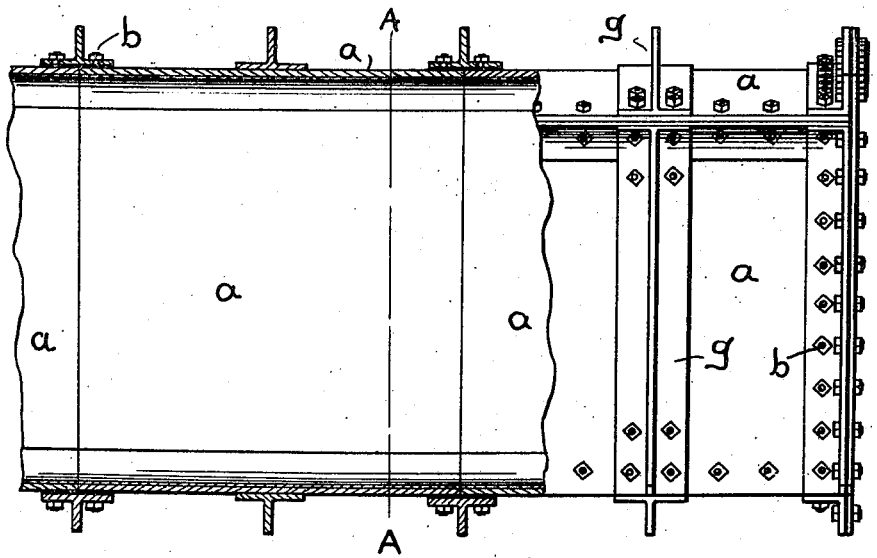
Figure 5:
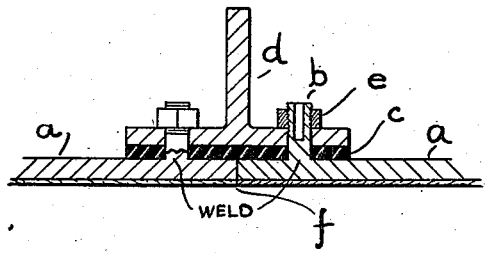
Figure 6:
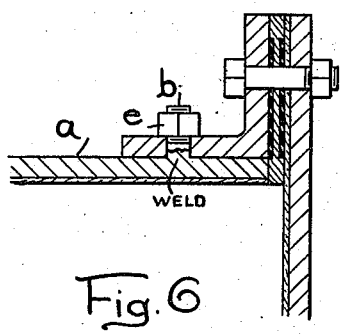
Figure 3:
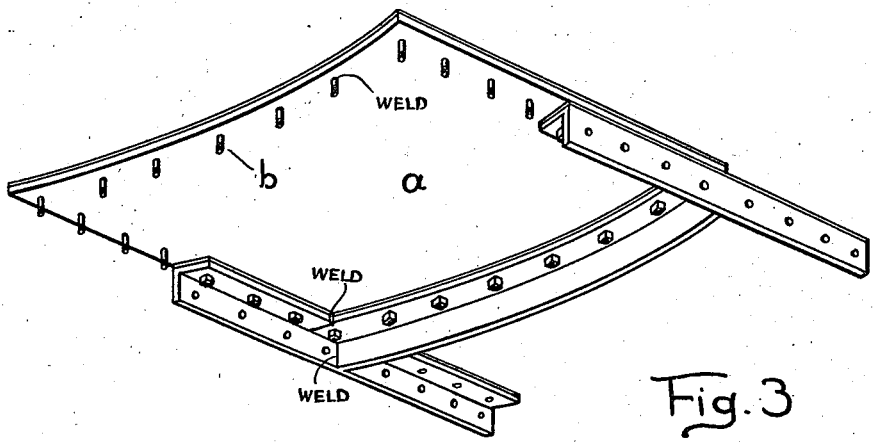
Figure 7:
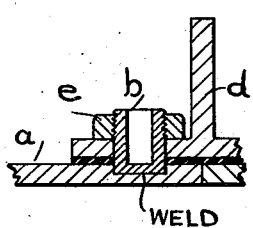
Figure 4:
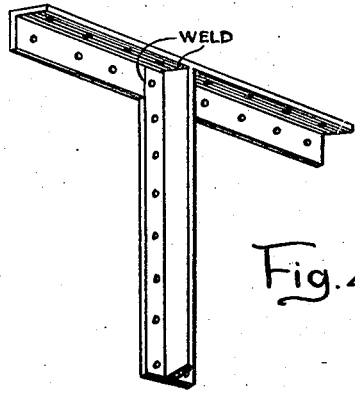

In the drawings: Figure 1, is a side elevation of a rectangular tank, a part only being shown and this being partially broken away to show the interior construction. Fig. 2 is a cross section on the line A—A of Fig. 1. Fig. 3 is a perspective of one of the bottom plates and one of the connecting strips. Fig. 4 is a perspective of one of the connecting members that I employ. Fig. 5 is a detail in section of the joint between two flush plates. Fig. 6 is a detail in section of such joint as is used at the ends on the top and bottom. Fig. 7 is a detail in section of a slightly modified form of joint.

It is a desideratum of tank construction to secure a practical rectangular tank as this obviously takes up less room than a round tank. One of the chief difficulties has been the multiplicity of joints required in a rectangular tank, and as each of these joints left a groove in the inside of the tank it became the depositing place of sediment and created an unsanitary condition, which made the use of square tanks impractical.
To obviate this I have already designed a flush joint that does away with this objectionable groove where two plates are connected together. I have secured this flush joint, as it appears from my prior application, Serial Number 854,205, by means of welding the flanges of the plates to such plates. This accomplishes my purpose but is rather expensive and makes the finished tank a rather expensive one.

My present invention is intended to secure the same result, to wit, a flush joint which will make possible the construction of rectangular tanks which are successful, but instead of employing the expensive welding construction of the entire flange, I find that I can secure the results by welding a plurality of studs near the edges of the plates to be united and then applying a connecting strip with perforations to fit over the studs. The ends of the studs are screw-threaded so that the connecting strip may be bolted to the plates that are to be connected.

*a* represents a section or plate of the tank, there being as many of these plates as is necessary for the length of tank desired. These plates are cut so that their edges have substantially square corners and consequently when the edges of two plates meet and the plates are in the same plane they form a substantially flush joint. It is necessary to join these plates by some method that will hold them securely together. The practice heretofore has been to bend or press the rolled steel plates near edges to form flanges, but as already explained, this results in a groove where the joint is made, for the reason that the bending of the flanges results in a curved surface rather than a square corner.

I weld a plurality of studs *b* on the out side face of the plate along the edges thereof as shown in Fig. 3. Preferably I use studs which are partially hollow on the inside, as shown in Fig. 5. The hollow interior of the stud stops short of extending the complete length of the stud by a distance which is substantially equal to the thickness of the plate to which it is welded, for in welding it is advantageous to have the member that is to be welded to a plate the same thickness as the plate itself. I then spot weld (preferably) the stud to the plate. The free end of the stud is screw-threaded for the reception of a nut. The two adjacent plates that are to be joined have each a row of these studs along the meeting edges, as shown in Fig. 5. A connecting strip, which is preferably a strip T-shaped in cross section, is then fitted over the studs, the strip having perforations in the flanges for fitting over the studs. However, it is advisable before the connecting strip is fitted over the studs to insert a packing strip *c* which is perforated to fit over the studs. With the packing strip *c* in place and the connecting strip *d* fitted over the studs and the packing strip, the nuts *e* can be run upon the threads of the studs and by tightening the nuts the connecting strip and the two plates $a$ $a$ together with the packing, will be tightly bound together.

It will be noticed that at $f$ in Fig. 5, a practical flush joint is furnished on the inside, for the original right angular corners of the plates are brought together in flush relation forming a true straight angle of 180 degrees. It will also be noticed that the packing is laid in a plane parallel with the plates $a$, while heretofore it has been customary to pack the joint in a plane at right angles to the plates $a$ $a$ and between the two flanges that have either been bent or fastened to the plates for securing the plates together. The previous form of packing as required was known as a composite packing strip, comprising a strip of metal, usually aluminum, and a strip of softer packing such as rubber, because it was inadvisable to have the rubber portion of the packing exposed on the inside of the tank itself. My form of joint wholly does away with the necessity of such a composite packing, which is expensive, for the packing is entirely removed from proximity with the inside of the tank. The two meeting edges of the plates $a$ are therefore not separated by a packing, but can be drawn directly together so that the enameling on the inside is practically continuous.

Another advantage of this form of construction is that with the doing away of the old form of flanges which are either bent back from the plates themselves or else are fastened to the edges of the plates such as by welding, the strain has been taken off of the edges of the plates. For instance, in what is known as a pressure tank, where the contents of the tank is under a pressure, there is a tendency of the plates to separate, and consequently as the connection of the plates is only by bolting through the flanges, there is a tendency of the plates and the flanges to change their angular relation. This tendency would be of little moment were it not for the fact that the inside of these plates are glass enameled, and any pulling tendency will crack the enamel. It has, therefore, been found in practice that in pressure tanks the enamel does crack along the joint due to this pulling tendency. In my arrangement of studs, as already explained, there is no strain whatever upon the enamel at the edges of the plates, nor in fact is there any strain on the enamel anywhere, as all the stresses act upon the studs on the back of the plates.

The connecting strips, as already mentioned, are preferably T-shaped in cross section. In the pressure tanks I find it advisable to construct the connecting strips as shown in Figs. 3 and 4. Each connecting strip for the bottom of the tank has an angle strip welded to it at the top and the bottom so that the connecting member itself is really in the form of an I as shown in Fig. 3. The head angle metal strip and the foot angle metal strip extend to either side just the distance of half the width of a plate, and consequently the connecting members along the bottom of the tank are in the form of a plurality of I's while the connecting members along the sides are in the form of a plurality of T's.

In pressure tanks it will be found preferable to use between the adjacent I's and T's stay bars $g$ also T-shaped in cross section (see Fig. 1). These stay bars are also extended up over the top of the tank. However, it is not necessary to fasten a stay bar along its complete length. It will be sufficient if it is fastened at both ends.

In Fig. 7, a slightly modified form is shown. The plates are drilled for half their thickness by a multiple drill. Hence the studs are set into the plates before being welded and the welded joint is stronger. Then too, uniformity of the metal is better approximated to secure the best results in enameling, as explained above.

What I claim is:

1. The method of constructing tank joints, which comprises the fitting of two plates together, edge to edge, the welding of studs to the outside of the plates adjacent the meeting edges, and the fastening of a connecting strip to the studs of adjacent plates.

2. The method of constructing tank joints, comprising the fitting of two plates together, edge to edge, the welding of studs to the outside of the plates adjacent the meeting edges, the fitting of a packing over the outside portions of the plates adjacent their meeting edges, said packing being disposed parallel with the plates, and the securing of a connecting strip over the free ends of the studs and the packing.

3. The method of constructing a tank joint, comprising the fitting of two plates together, edge to edge, the welding of studs, having their free ends screw-threaded, to the outside of the plates adjacent the meeting edges, the fitting of a connecting strip over the studs, and the placing of nuts upon the screw-threaded ends of the studs and drawing the connecting strip and the plates together.

4. The method of constructing a tank joint, comprising the fitting of two plates in edge to edge contact, the spot welding of partly hollow studs to the outside faces of the plates adjacent their meeting edges, and the securing of a connecting strip over the studs to hold the two plates together.

5. The method of constructing a tank joint, comprising the fitting of two plates in edge to edge relation, the welding of studs on the back of the plates adjacent the meeting edges, and the securing of a connecting strip T-shaped in cross section over the studs to hold the two plates together.

6. The method of constructing tank joints, comprising an arrangement of a pair of plates adjacent to each other, the welding of studs to the back of one of the plates along its meeting edges, the securing of a connecting strip over the studs, the fastening of such connection strip to the other plate, and the fastening of the studs to the connecting plate.

7. The method of constructing tank joints, comprising the arranging of a pair of plates edge to edge, the securing of studs to the back of the plates near the meeting edges, the placing of a connecting strip over the studs, and the securing of the studs to the connecting strip.

8. The method of constructing tank joints, which comprises the welding of studs to the back of two plates adjacent the meeting edges, the coating of the faces of the plates with enamel and baking same thereon, the fitting of the two plates together edge to edge, and the fastening of the studs on the two plates together.

9. The method of constructing tank joints, comprising the drilling of a pair of plates, the arranging of the same edge to edge, the welding of studs in the drilled holes of the plates and the connecting and securing of the studs of adjacent plates together.

In testimony whereof, I sign this specification in the presence of two witnesses.

HENRY C. WIEDEMAN.

Witnesses:
STUART C. BARNES,
VIRGINIA C. SPRATT.